(No Model.)

D. M. CUMMINGS & N. E. FRARY.
STRAW CUTTER.

No. 259,503. Patented June 13, 1882.

Attest:
Courtney A. Cooper.
Josephine Campbell.

Inventor:
D. M. Cummings
N. E. Frary
By their attorney
Charles E. Foster

UNITED STATES PATENT OFFICE.

DANIEL M. CUMMINGS, OF ENFIELD, NEW HAMPSHIRE, AND NATHANIEL E. FRARY, OF BRADFORD, VERMONT.

STRAW-CUTTER.

SPECIFICATION forming part of Letters Patent No. 259,503, dated June 13, 1882.

Application filed March 14, 1882. (No model.)

*To all whom it may concern:*

Be it known that we, D. M. CUMMINGS and N. E. FRARY, residing respectively in Enfield, Grafton county, New Hampshire, and Bradford, Orange county, Vermont, have invented certain new and useful Improvements in Straw-Cutters, &c., of which the following is a specification.

Our invention is a machine for cutting straw and other materials which it is desirable to reduce to a comminuted state; and it consists of a gang of circular cutters arranged obliquely upon a shaft, in combination with a suitable bar or rest and means for feeding the material to the edges of the cutters, as fully described hereinafter.

Figure 1:
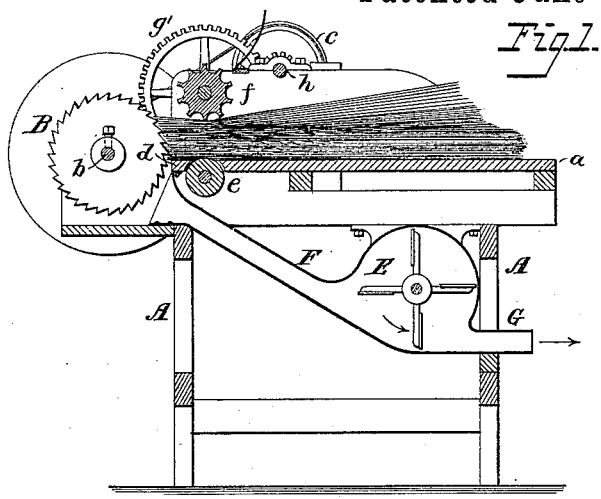
Figure 2:
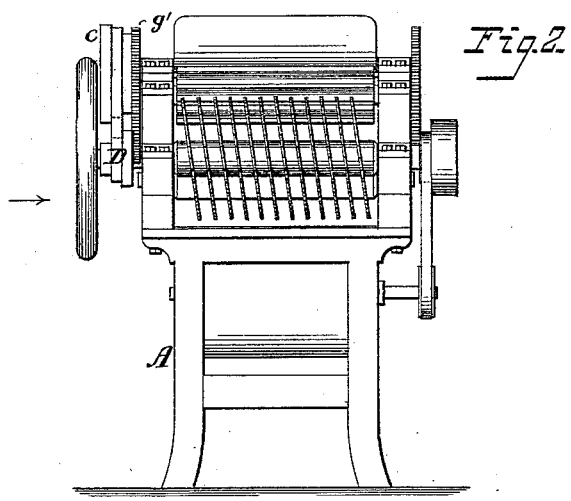

In the drawings, Figure 1 is a sectional elevation of our improved cutter. Fig. 2 is a front elevation, and Fig. 3 a side elevation, thereof.

The frame A of the machine is suitably supported on legs, and has a platform or table, $a$, and bearings for the shaft $b$ of a gang of circular cutters, B. These cutters may be constructed in different ways, according to the material to be comminuted. When driven very fast and used for very hard substances they may consist of sheet metal with roughened edges, or the edges may be milled. As shown, for use in cutting straw, they have ordinary saw-teeth. Each cutter is set parallel to the others obliquely upon the shaft $b$, so that as the shaft revolves the cutting-edges will have a rotary and a lateral reciprocating motion opposite a transverse bar or rest, $d$, secured to the front of the platform $a$.

At the rear of the bar $d$ is a feed-roll, $e$, its upper edge nearly flush with that of the platform, and above the feed-roll is a toothed or fluted roller, $f$, to which motion is communicated by gears $g$ $g'$ from a feed-shaft, $h$, the latter being provided with a cone of pulleys, C, round which a belt passes to a cone-pulley, D, on the shaft $b$.

The straw or other material to be comminuted is fed forward over the platform $a$ toward the cutters, the cutting-teeth of which, as they approach the bar $d$ and as they move laterally from side to side, traverse the whole front surface of the material with both a cutting and a rasping action, which we have found to be exceedingly effective in very rapidly reducing the material to the desired comminuted condition.

Figure 3:
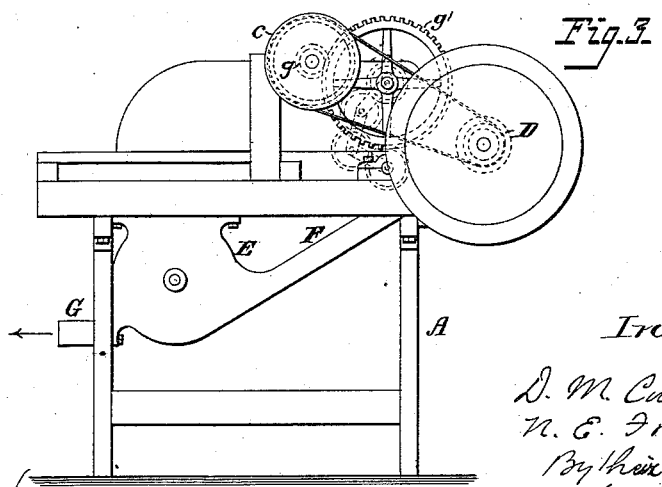

To secure a more positive feed, the lower roller, $e$, may be geared with the upper roller, $f$, by gears arranged as shown in dotted lines, Fig. 3, and hung in links to accommodate the gear to the movement of the belts, and springs may be connected to the bearings of the upper roll to carry it downward forcibly upon the material to condense it.

Other means may be adopted for driving one roll positively from the other while permitting them to approach and separate, and for condensing the material as it approaches the cutters.

The comminuted material may drop into a suitable receptacle; but we prefer to conduct it directly from the machine to its place of stowage by means of a blast. Different blowing devices may be used. We have shown a fan-blower, E, arranged in a conduit, F, extending from the point where the comminuted material leaves the cutters to the blower, and thence a tube, G, extends to the point where the material is deposited.

By removing the material as soon as cut all clogging of the machine is avoided.

We claim—

1. A machine for comminuting materials, consisting of a gang of independent circular cutters arranged obliquely upon a shaft and parallel to each other, in combination with a bar or rest arranged opposite the cutting-edges, and with a platform supporting the material to be fed to the cutters, substantially as set forth.

2. The combination of the shaft $b$, gang B of independent circular cutters set obliquely, bar $d$, and feed-rolls $f$ $e$, substantially as set forth.

3. The combination, with the cutters and means for driving the same and feeding the material thereto, of a blowing apparatus and conduits whereby the material as fast as cut is carried away from the cutters, and is then conducted to the receptacle outside the machine by an air-blast, as specified.

In testimony whereof we have signed our names to this specification in the presence of two subscribing witnesses.

DANIEL M. CUMMINGS.
NATHANIEL E. FRARY.

Witnesses:
J. W. DODGE,
L. W. CURRIER.